Jan. 2, 1962    J. G. VAN SANTEN ET AL    3,015,731
RADIATION INDICATING DEVICE
Filed July 29, 1955
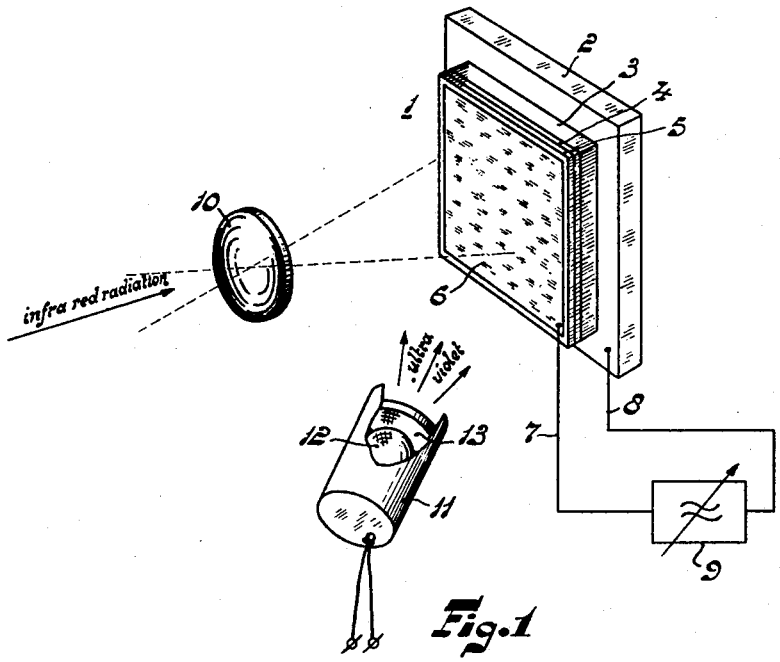
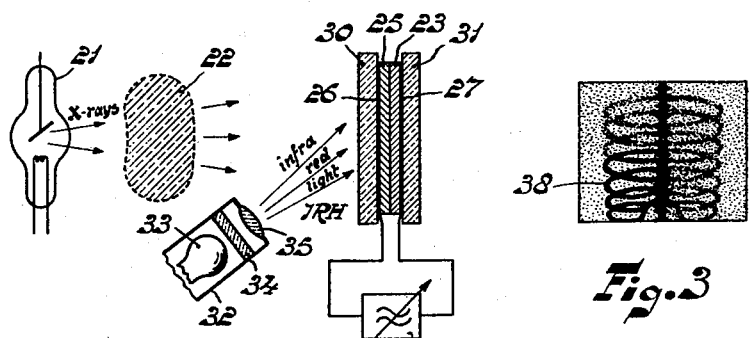
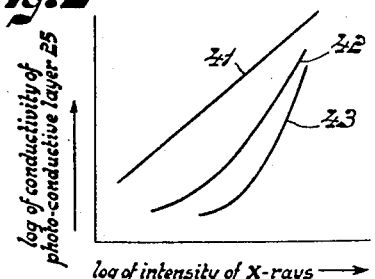
INVENTORS
Johannes Gerrit Van Santen
Gesinus Diemer
BY
AGENT

United States Patent Office 3,015,731
Patented Jan. 2, 1962

3,015,731
RADIATION INDICATING DEVICE
Johannes Gerrit van Santen and Gesinus Diemer, Eindhoven, Netherlands, assignors, by mesne assignments, to North American Philips Company, Inc., New York, N.Y., a corporation of Delaware
Filed July 29, 1955, Ser. No. 525,323
Claims priority, application Netherlands Aug. 21, 1954
12 Claims. (Cl. 250—213)

This invention relates to a device for indicating electromagnetic or corpuscular radiation, and in particular to a device including a photo-conductive part and an electroluminescent part electrically connected in series, together with means for applying a potential across the two parts.

The chief object of the invention is to provide a device of the foregoing type which is more sensitive to infra-red light or which enables the production of an electroluminescent image exhibiting greater contrast than images of the known devices.

The invention is based upon the realization that certain photo-conductive substances exhibit the property of a reduction in conductivity when these substances are subject to visible light or ultraviolet light and also to corpuscular radiation, for example, particles, if they are simultaneously irradiated with infrared light. This so-called extinction or quenching effect of the photo-conductivity is described, for example, in Physical Review, 87, 91–107, in an article by Kallman and Kramer entitled "Induced Conductivity and Light Emission in Different Luminescent Type Powders," in which article reference is made to several substances which exhibit this extinction effect, for example, zinc sulphide and cadimum-zinc sulphide activated by particular activators.

In accordance with the invention, the photo-conductive part of the device for indicating electro-magnetic or corpuscular radiation comprises a material which exhibits the aforesaid extinction effect, and means are provided for irradiating the photo-conductive part by an auxiliary radiation differing from the radiation to be indicated, with one of these two radiations being constituted by infrared light.

The device according to the invention may be used for indicating infrared light, in which case the auxiliary radiation may then be constituted by visible light or electromagnetic radiation of smaller wavelength or by corpuscular radiation. The sensitivity of this device for infrared rays exceeds that of known devices, in which the photo-conductivity produced by the radiation to be indicated alone determines the intensity of the electro luminescent light. In the case of extinction or quenching by infrared light, the variation in conductivity of the photo-conductive material materially exceeds, as a rule, the variation produced by infrared radiation alone.

A visible, electro-luminescent image of an image produced on the photo-conductive part by infrared rays may be obtained in the same manner as with known devices by associating with each photo-conductive part an electroluminescent part connected in series therewith. Such is obtained, for example, by applying both parts, in the form of layers of equal size, to one another with the interposition of an opaque intermediate layer, and by providing them with external transparent electrodes. However, contrary to the known devices, the device according to the invention provides an electro-luminescent image which is a negative of the original infrared image on the photo-conductive layer.

In a further embodiment of a device according to the invention, the auxiliary radiation is constituted by infrared light. This auxiliary radiation reduces the photo-conductivity produced by the radiation to be indicated, constituted by visible radiation or shortwave electro-magnetic radiation or corpuscular radiation in the photo-conductive part, which reduction is greater when the intensity of the electro-magnetic or corpuscular radiation is smaller. In this device, the intensity of the electroluminescent image varies with a given variation in the intensity of the incident non-infrared radiation to a greater extent than in the absence of the infrared auxiliary radiation. Consequently, a device according to the invention provides a greater sensitivity to variations of the intensity of the radiation to be indicated. By providing the photo-conductive part and the electroluminescent part in the form of series-connected layers, this device may also be used for the reproduction of local intensity variations in the non-infrared radiation to be indicated, so that an electro-luminescent image with strong contrasts is obtained. If the radiation image is produced by visible light, this strong contrast will, as a rule, not be desired. Conditions are different, however, if we are concerned with a radiographic image produced by high velocity elementary particles or X-rays. In this case, an increase in contrast is frequently desired for the observation of fine details. With the device according to the invention, the desired increased contrast is obtained by using infrared rays as an auxiliary radiation.

The invention will now be described with reference to the accompanying drawing in which:

FIG. 1 shows diagrammatically a device according to the invention for converting an infrared image into a visible image.

FIG. 2 shows diagrammatically an X-ray indicating device according to the invention.

FIG. 3 shows a typical visible image obtained by means of the device shown in FIG. 2.

FIG. 4 shows a graph of the logarithmical relationship between the conductivity of the photo-conductive substance used in the device shown in FIG. 2 and the intensity of the X-rays producing this conductivity, the parameter being the intensity of the infrared auxiliary radiation.

The device shown in FIG. 1 comprises an image screen designated by 1 comprising three superimposed thin layers 3, 4 and 5, which are supported by a plate 2 of conductive glass. The thickness of the layers is shown on a greatly enlarged scale for the sake of clarity. The layer 3, applied immediately to the front side of the plate 2, is an electro-luminescent layer and is constituted for example mainly by copper-activated zinc sulphide. The layer 5 on the front side of the screen 1 is constituted mainly by a photo-conductive material, which is capable of producing by means of infrared radiation a reduction of the photo-conductivity produced by a different radiation. The layer 5 may, for example, contain cadmium sulphide activated by silver, together with gallium as a coactivator. Between the photo-conductive layer 5 and the electroluminescent layer 3 provision is made of a thin, opaque layer 4 having substantially no conductivity, which may for example be made of black lacquer. The layer 4 prevents electroluminescent light from the layer 3 from penetrating into the photo-conductive layer 5. As an example only, the photo-conductive layer 5 may be about 500μ thick, the electro-luminescent layer 3 about 50μ thick, and the opaque layer 4 about 40μ thick.

To the photo-conductive layer 5 is applied a thin, radiation-transparent electrode 6, which may, for example, be constituted by an extremely thin metal layer or nickel oxide layer. Instead of using a thin electrode use may be made of a second, conductive glass plate on the front side of the photo-conductive layer 5.

The electrode 6 and the conductive plate 2 are connected by means of conductors 7 and 8 to a source of variable alternating voltage 9, which applies an alternating voltage with adjustable amplitude to the series combination of the layers 5, 4 and 3. The frequency of this alternating voltage may, for example, be 500 cycles per second, and a typical R.M.S. voltage value of about 400 volts. By means of an optical system 10 (shown diagrammatically) infrared radiation, designated in the drawing by an arrow, produces an infrared image on the photo-conductive layer 5 through the electrode 6.

At the side of the optical system 10, there is provided an auxiliary source of light, which in this case produces ultraviolet light irradiating the photo-conductive layer 5 simultaneously with the forming of the infrared image thereon. This auxiliary radiation is designated in FIG. 1 by the arrows and emanates from an ultraviolet lamp 12, housed in a housing 11 wherein an ultraviolet filter 13 is provided in front of the lamp. Due to the ultraviolet auxiliary radiation emanating from the lamp 12, the photo-conductive layer 5 exhibits a given conductivity in each of its surface elements. The voltage from the alternating voltage supply 9 is now adjusted in a manner such that the electro-luminescent layer 3 luminesces uniformly in the absence of the infrared radiation to be indicated. If infrared radiation now strikes the photo-conductive layer 5, it will reduce, in accordance with its local intensity, the conductivity of the photo-conductive material produced by the ultraviolet auxiliary radiation, so that locally a more or less increased voltage occurs in the photo-conductive layer and thus a corresponding local reduction of the voltage across the electro-luminescent layer is produced. This reduction, which is related locally with the intensity of the infrared radiation striking the photo-conductive layer 5 at the corresponding area, produces a corresponding local variation in the intensity of the electro-luminescent light, so that a visible electro-luminescent image is produced on the rear side of the plate 2 which is a negative of the infrared image produced on the photo-conductive layer 5.

In the device described above, the ultraviolet auxiliary radiation is employed to produce a certain photo-conductivity which in turn is extinguished by the infrared light to be indicated. This photo-conductivity may, as an alternative, be obtained by means of corpuscular radiation, for example, by means of particles or electrons. To this end, a radio-active material may be incorporated in the photo-conductive layer 5, which material produces photo-conductivity in this layer by the emission of high velocity elementary particles. For example, an extremely small quantity of radio-active cobalt may be distributed in this layer 5.

FIG. 2 shows an indicating device in which an X-ray beam, designated by arrows, produced by an X-ray tube 21, traverses a test person 22 and falls on an image screen producing a certain photo-conductivity in the photo-conductive layer 25 corresponding to the local intensity of the beam. This layer 25, which may be made of silver-activated zinc sulphide with gallium as a co-activator, is in direct contact with an electro-luminescent layer 23 of about the same size. The layers 25 and 23 are provided with transparent electrodes 26 and 27, one on each side, these electrodes being connected to a source of alternating voltage 29, the amplitude of which is variable. The layers 25 and 23, together with the electrodes 26 and 27, are sandwiched between two glass plates 30 and 31.

The voltage of the supply 29 is adjusted in a manner such that, in the absence of the X-rays, the layer 23 luminesces slightly. The photo-conductivity of the layer 25 produced by the X-ray beam will give rise to a locally more or less amplified electro-luminescence in the layer 23, so that, viewed from the right, an image of the test person 22 may be observed. The device further includes an auxiliary radiation source constituted by a lamp 33 housed in a housing 32 and radiating infrared light which can be directed through an infrared filter 34 and a lens 35 to a given part or to the whole of the photo-conductive layer 25. The infrared auxiliary light, which is designated in FIG. 2 by arrows, reduces the photo-conductivity produced by the X-rays at those areas where it strikes the photo-conductive layer 25, the reduction being greater where the intensity of the X-ray beam is lower. This is evident from FIG. 4, in which, logarithmically, the conductivity of the photo-conductive material is plotted against the intensity of the X-ray beam. In this graph, the straight line 41 results in the absence of infrared auxiliary radiation. The curve 42 results, if simultaneously with the X-rays, infrared light is radiated with a given intensity on the photo-conductive layer 25, and the curve 43 results when the intensity of the radiated infrared light is increased.

Consequently, in the device shown in FIG. 2, the infrared auxiliary radiation increases the contrast in the electro-luminescent image at the area where the infrared auxiliary radiation strikes the photo-conductive layer 25. If the source of auxiliary infrared radiation is arranged so as to be movable, so that the infrared beam may be directed as desired to any part of the photo-conductive layer 25, a given part of the electro-luminescent image may be produced with a richer contrast as desired. FIG. 3 shows such an electro-luminescent image, in which an area 38 exhibits a greater contrast than the other parts of the image due to irradiation of the corresponding part of the photo-conductive layer 25 by the infrared auxiliary rays.

While we have described our invention in connection with specific embodiments and applications, other modifications thereof will be readily apparent to those skilled in this art without departing from the spirit and scope of the invention as defined in the appended claims.

What is claimed is:

1. A radiation-indicating device comprising a photo-conductive element whose conductivity increases in response to radiation shorter in wavelength than infrared and whose conductivity reduces when subject to infrared, an electro-luminescent element, means to apply a potential across the photo-conductive and electro-luminescent elements in series, whereby the radiation produced by each elemental area of the electro-luminescent element depends upon the potential thereacross, which potential in turn depends on the quantity of radiation impinging on a corresponding elemental area of the photo-conductive element, and two sources of radiation, including infrared and shorter wavelength radiation, arranged to impinge their radiation on said photo-conductive element.

2. A radiation-indicating device comprising adjacent photo-conductive and electro-luminescent layers with means for applying across said layers in series a potential, whereby the amount of light produced by each elemental area of said electro-luminescent element depends upon the intensity of a radiation image impinging on a corresponding elemental area of the photo-conductive layer, said photo-conductive layer being constituted of a material capable of having its conductivity increased upon being subjected to radiation shorter in wavelength than infrared, and capable of having its increased conductivity decreased upon being subjected to infrared radiation, means for impinging on said photo-conductive layer a first radiation from an external source, and an auxiliary source of radiation associated with said photo-conductive layer for irradiating same with a second radiation, one of said radiations being infrared, and the other being of a wavelength shorter than infrared.

3. A device as set forth in claim 2 wherein the first radiation from the external source is infrared.

4. A device as set forth in claim 2 wherein the second radiation from the auxiliary source is infrared.

5. A device as claimed in claim 1 in which one source of radiation is a radio-active substance, and the other source of radiation is an infrared image to be displayed.

6. A device as claimed in claim 5 in which the radio-active substance is incorporated in the photo-conductive element.

7. A device as claimed in claim 1 in which the photoconductive material is constituted by silver and gallium activated cadmium sulphide.

8. A radiation indicating device comprising a plurality of thin juxtaposed layers including a first radiation-transparent conductive layer, a photo-conductive layer, an electro-luminescent layer and a second radiation-transparent layer arranged in the order named, means applying a potential across the layers in series, said photo-conductive layer containing material whose conductivity is reduced by being subjected to infrared radiation, a source of primary radiation to be indicated mounted adjacent said photo-conductive layer, and an auxiliary source of radiation different from said primary source also mounted adjacent said photo-conductive layer, one of said sources producing infrared light.

9. A radiation indicating device comprising a plurality of thin juxtaposed layers including a first radiation-transparent conductive layer, a photo-conductive layer, a thin opaque nonconductive layer, an electro-luminescent layer and a second radiation-transparent conductive layer arranged in the order named, means applying an alternating potential across the layers in series, said photo-conductive layer containing material whose conductivity is reduced by being subjected to infrared radiation, a source of infrared radiation to be indicated mounted adjacent said photo-conductive layer, and an auxiliary source of radiation different from said primary source also mounted adjacent said photo-conductive layer, the potential having a value at which the electro-luminescent layer uniformly luminesces in the absence of the infrared radiation.

10. A radiation indicating device comprising a plurality of thin juxtaposed layers including a first radiation-transparent conductive layer, an X-ray responsive photo-conductive layer, an electro-luminescent layer and a second radiation-transparent conductive layer arranged in the order named, means applying a potential across the layers in series, said photo-conductive layer containing material whose conductivity is reduced by being subjected to infrared radiation, a source of primary X-radiation to be indicated mounted adjacent said photo-conductive layer, and an auxiliary source of infrared radiation also mounted adjacent said photo-conductive layer, said potential having a value at which the electro-luminescent layer luminesces only slightly in the absence of the X-radiation.

11. In combination, an electroluminescent layer; a photoconductive layer applied over the luminescent layer; said photoconductive layer being composed of photoconductive material susceptible to infrared photoconductive quenching; means coupled between said layers to apply a voltage therebetween; means to illuminate said photoconductive layer with incident light; and means to selectively irradiate said photoconductive layer with infrared to form an infrared image thereon, whereby photoconductive quenching ensues and said electroluminescent layer displays the negative of said image against an illuminated background.

12. In combination, a first transparent electrically conductive film; an electroluminescent layer applied over the first film; a photoconductive layer applied over the electroluminescent layer; and a second transparent electrically conductive film applied over the photoconductive layer; means coupled between said films to apply a voltage therebetween; means to illuminate said photoconductive layer with incident light; and means to selectively irradiate said photoconductive layer with infrared to form an infrared image thereon, whereby photoconductive quenching ensues and said electroluminescent layer displays the negative of said image against an illuminated background.

References Cited in the file of this patent

UNITED STATES PATENTS

| | | |
|---|---|---|
| 2,071,471 | Neubert | Feb. 23, 1937 |
| 2,225,044 | George | Dec. 17, 1940 |
| 2,239,887 | Ferrant | Apr. 29, 1941 |
| 2,470,173 | Leverenz | May 17, 1949 |
| 2,555,545 | Hunter et al. | June 5, 1951 |
| 2,642,538 | Urbach | June 16, 1953 |
| 2,650,310 | White | Aug. 25, 1953 |
| 2,717,971 | Sheldon | Sept. 13, 1955 |
| 2,742,438 | Thomsen | Apr. 17, 1956 |
| 2,792,447 | Kazan | May 14, 1957 |

FOREIGN PATENTS

| | | |
|---|---|---|
| 461,938 | Italy | Feb. 20, 1951 |
| 879,325 | Germany | Apr. 23, 1953 |
| 1,002,056 | France | Mar. 3, 1952 |

OTHER REFERENCES

R. W. Smith article, page 1526, Physical Review, volume 97, Number 6, Mar. 15, 1955.